UNITED STATES PATENT OFFICE 2,511,319

DECARBOXYLATION INHIBITOR

Jay Morton Beiler and Gustav J. Martin, Philadelphia, Pa., assignors to The National Drug Company, Philadelphia, Pa., a corporation of Pennsylvania No Drawing. Application September 10, 1947, Serial No. 773,300

1 Claim. (Cl. 260—297)

Our invention relates to a new chemotherapeutic agent. More particularly, it relates to phosphorylated desoxypyridoxine and to a process of preparing same.

In the specification and claim of this application, the term "desoxypyridoxine" is used to designate the chemical compound "2,4-dimethyl-3-hydroxy-5-hydroxymethylpyridine" as in the published articles by Mushett et al, Proc. Physiol. Soc. of Phil., 22, 13, 1947, and Mushett, Fed. Proc., 6, 397, 1948.

Many strains of bacteria are known to have the property of decarboxylating certain amino acids. The enzymes produced by such bacteria are referred to as amino acid decarboxylases. Their activity depends upon the presence of small amounts of a coenzyme that appears to act in much the same way as a catalyst.

Investigations of these amino acid decarboxylases have shown that the coenzyme of tyrosine decarboxylase is a phosphorylated pyridoxal. In addition, there is evidence to show that this compound functions as the coenzyme of lysine, arginine and ornithine decarboxylases. Further, the wide distribution of the compound throughout animal tissue suggests that it may function as the coenzyme of at least some of the animal amino acid decarboxylases. The known group of these enzymes comprises histidine, tyrosine, tryptophan, cysteic acid and dihydroxyphenylalanine decarboxylases. Such animal amino acid decarboxylases cause the production of histamine, tryptamine, tyramine, and dihydroxyphenethyl amine, all of which are toxic to the animal body.

The function of the amino acid decarboxylases in bacterial metabolism is believed to be twofold:

(a) They tend to regulate the pH of the surrounding medium. At acid pH, $CO_2$ is given off, reducing the acidity. At alkaline pH the enzymes function as transaminases, and cause $NH_3$ to be given off, thus reducing the alkalinity.

(b) They supply $CO_2$, which is an essential metabolite for many bacteria.

It is obvious that an inhibition of the action of these decarboxylases would on this basis affect adversely the growth of the bacteria.

The principal object of our invention is to provide a chemotherapeutic agent that will effectively inhibit the action of the animal amino acid decarboxylases and thereby avoid any pathological conditions that would be caused by an overproduction of the toxic amines mentioned above. Another object is to prepare such a chemotherapeutic agent. Further objects will become apparent from the detailed description that follows.

We have found that desoxypyridoxine, which is known to be an effective displacer of pyridoxine (vitamin $B_6$) does not inhibit the action of a preparation of tyrosine decarboxylase derived from Strep. faecalis R, although the coenzyme of this decarboxylase is a pyridoxine derivative. However, when desoxypyridoxine was phosphorylated chemically it did function as an effective displacer in this system, causing an inhibition of 35% in concentrations of about 10 mg. per cc. Consequently it may be employed as an intestinal antiseptic for the purpose of inhibiting the formation of tyramine, a toxic pressor base, in the gastrointestinal tract. We have found that a dosage of from 0.1 to 1 gram administered from 1 to 6 times daily is effective for this purpose.

The phosphorylated desoxypyridoxine is a new chemical product. The method employed for the phosphorylation of desoxypyridoxine is as follows:

22 mg. of desoxypyridoxine were dissolved in 2.2 cc. of water and 0.2 cc. of 1:1 sodium hydroxide was added to this solution. The resultant solution was chilled in an ice bath and 0.1 cc. of phosphorus oxychloride, together with 0.4 cc. of 1:1 sodium hydroxide, was added thereto. The mixture thereupon solidified. It was warmed until the precipitate dissolved, and then chilled again. The addition of the same amounts of phosphorus oxychloride and sodium hydroxide was repeated four more times, with warming between each addition. After the last treatment the solution was chilled until small crystals formed throughout the container. It was then centrifuged while cold and the precipitate thus separated was discarded. The supernatant liquid, which contains the phosphorylated desoxypyridoxine, was brought to a pH of from 6 to 7 by the addition of hydrochloric acid and was then diluted with water to 25 cc. Portions of this solution were then employed to measure the inhibitory action of our new chemotherapeutic agent.

It will be apparent to those skilled in the art that many variations are possible in the details of the method just described, and that these may be made without departing from the spirit of the invention disclosed herein. It is to be understood that our invention is not limited to such details but includes all variations within the scope of the appended claim.

We claim:

Phosphorylated desoxypyridoxine produced by the reaction of desoxypyridoxine with phosphorus oxychloride in an aqueous sodium hydroxide medium.

JAY MORTON BEILER.
GUSTAV J. MARTIN.

REFERENCES CITED

The following references are of record in the file of this patent:

UNITED STATES PATENTS

| Number | Name | Date |
|---|---|---|
| 2,248,078 | Harris | July 8, 1941 |

OTHER REFERENCES

Rosenberg: Chemistry and Physiology of the Vitamins (1942), Science Publishers, p. 209

Gunsalus: J. Biol. Chem., vol. 155, pp. 685–686 (1944)

Umbreit: Archives of Biochem., vol. 7 (1945), pp. 185–199.

Ott: Chem. Abstracts, vol. 40, p. 2873 (1946).

Beiler: J. Bio. Chem., July 1947, pp. 345–347.